Patented Dec. 28, 1937

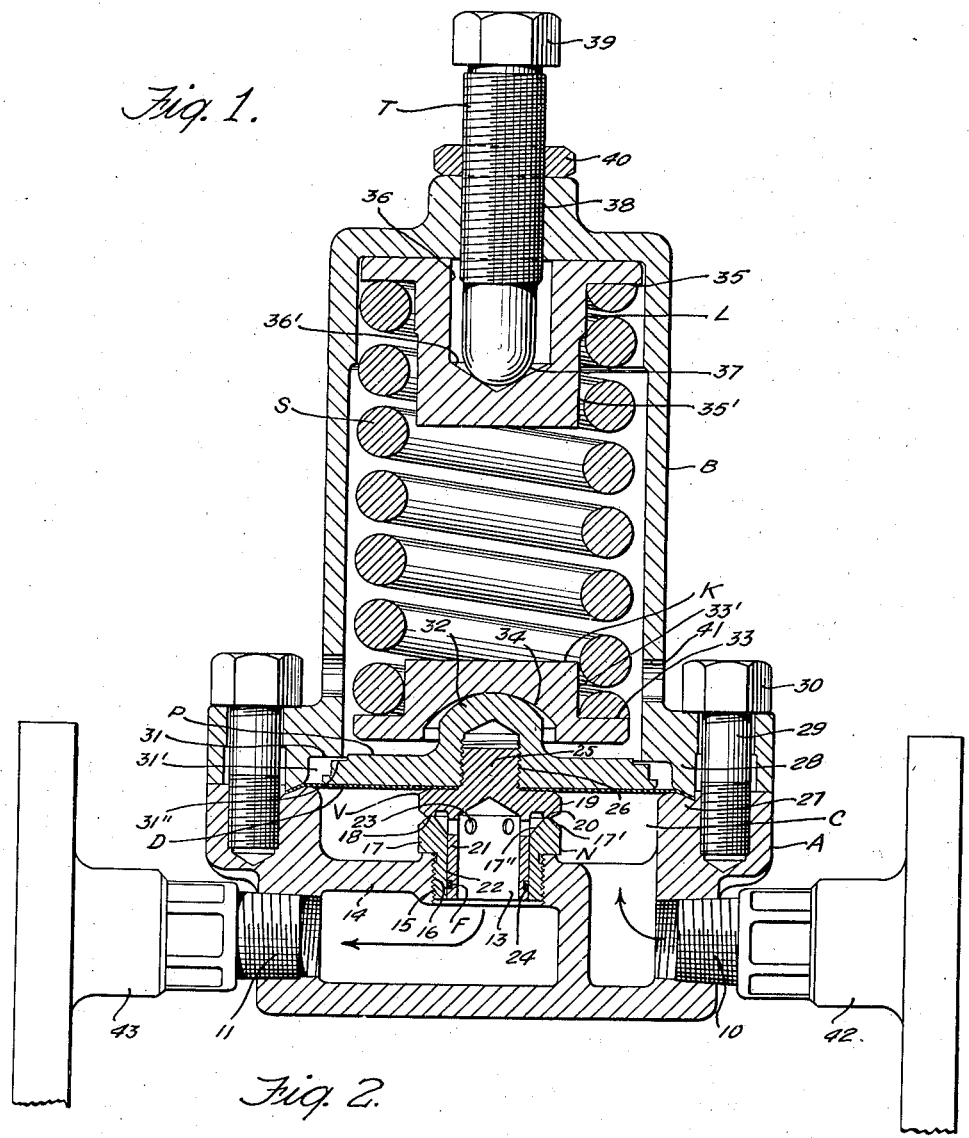

2,103,725

UNITED STATES PATENT OFFICE 2,103,725

VALVE

Wilgot J. Jacobsson, Buffalo, N. Y., assignor, by mesne assignments, to Union Carbide and Carbon Corporation, a corporation of New York Application November 30, 1932, Serial No. 644,927

2 Claims. (Cl. 137—53)

This invention relates to valves, and more particularly to an improved back pressure or relief valve of a quick-opening type which operates between narrow limits of fluid pressure as a safety device on high pressure vessels or pipe lines.

The principal objects of this invention are to provide an improved pressure relief device having: a valve element which opens quickly when the pressure reaches a given value and which closes as quickly when the pressure falls; means for accurately guiding the valve element and for supplying a constant amount of friction to prevent chattering and humming in the valve; and a spring centering means for directing the full force of the spring centrally against the valve element.

The above and other objects and the novel features of this invention will become evident from the following description and the accompanying drawing, of which Fig. 1 is a central cross-sectional view of a pressure relief valve embodying this invention; and Figs. 2 and 3 are a plan view and a side view, respectively, of the friction ring employed to prevent chattering.

As shown in Fig. 1, the improved valve may comprise a body A having an inlet 10 and an outlet 11, and a cap B secured to the upper side of the body. The passage of fluid from the inlet 10 to the outlet 11 is controlled by a movable valve element V actuated by a diaphragm D which is clamped between the body A and cap B to provide the top of a chamber C in direct communication with the inlet 10. A spring S in the cap B exerts pressure against the diaphragm D to normally maintain the valve in a closed position, the spring being adjustable to determine the opening pressure for the valve.

The body A has a partition 14 therein which separates the chamber C from the outlet 11 and is provided with an opening 15 which serves as the outlet of chamber C and is tapped to fit the externally threaded section 16 of a tubular nozzle member or seating element N. When the nozzle N is secured in the opening 15, the hexagonal head 17 thereof projects into the chamber C. The upper side of the head 17 is chamfered, as at 17', and countersunk, as at 17", to leave a relatively narrow annular seating face 18 which cooperates with a similarly raised annular seating face 20 on the under side of the hexagonal head 19 of the valve V. The seating face 20 may be somewhat wider than the face 18 to insure complete sealing contact even when the valve and nozzle are not exactly in alinement, and both faces are ground to suitable flat or cooperating surfaces to insure a fluid-tight seal when the valve is closed. The diameters of the sealing faces 18 and 20 are large so that with only a slight valve lift a relatively large annular port area is presented through which a sufficient volume of gas may readily pass to quickly relieve the excess pressure.

In order to maintain accurate alinement of the sealing faces 18 and 20, the valve V is provided with means for guiding it relatively to the nozzle N. As shown, a tubular stem or guide sleeve 21 is preferably integrally connected to and depends from the under side of the head 19 within the seating face 20. The guide stem 21 slidably fits the relatively large cylindrical bore 22 of the nozzle N, and the internal diameter of this stem is comparatively large so that the released gas may rapidly escape therethrough. Gas may be admitted into the tubular stem 21 through a circular row of ports 23 drilled through the wall of the stem close to the under side of the head and opposite the seating face 20 and the countersink 17". The ports 23 are preferably in a plane a sufficient distance below the plane of the seating face 20 to bring them directly into the plane of and opposite the opening between the faces 18 and 20 when the valve V is lifted. The size and number of ports 23 are ample to quickly pass the gas volume that is released when the valve V reaches its maximum opening.

Suitable means may be provided to eliminate axial play, as well as vibration and humming, of the valve. According to this invention, the outer surface of the tubular stem 21 near its lower open end may be provided with a relatively narrow circumferential groove 24, having parallel side walls, to receive a friction ring F. As shown in Figs. 2 and 3, this ring may comprise a piece of spring wire bent to an incomplete annular shape and of such size that it may be contracted and inserted into the groove 24, so that the ring will constantly and frictionally engage the internal bore 22 of the nozzle N. The split ring has a number of sinuous bends lengthwise thereof which alternately extend above and below the central plane of the ring, to make the normal overall axial width of the ring slightly greater than the width of the groove 24 which is subject to substantially the same gas pressure on each side thereof. However, these sinuous bends yield slightly when the ring is pressed into the groove so that alternate resilient bends will engage opposite walls of the groove. The ring thus will be securely but yieldingly held in the groove 24 and against the bore 22, and provides a dampening effect which eliminates axial play and vibration or humming of the valve.

Suitable means may be provided to connect the valve element V to the diaphragm D and to apply the pressure of spring S to the latter. According to this invention the valve element is directly secured to the centrally-apertured diaphragm by clamping the inner marginal portion of the latter between the top side of the valve head 19 and the under side of a circular diaphragm backing plate P which preferably bears against the major portion of the upper side of the diaphragm. A central threaded stud 25 on the upper side of the valve head 19 projects through the central hole in the diaphragm into engagement with the threads of a tapped drilling 26 in the plate P. The outer margin of the diaphragm may be clamped in gas-tight manner between the body A and the cap B, which have cooperating grooved and tongued inclined flanges 27 and 28, respectively, for clinching the downwardly inclined outer margin of the diaphragm when the body and cap are secured together by the bolts 29 and nuts 30.

The inside diameter of the lower end of the cap B is enlarged to provide an annular shoulder 31 and a recess 31' beneath this shoulder to receive the outer margin of the plate P which is of such thickness that its upper surface is normally spaced a short distance from the shoulder 31. This shoulder serves as a stop to limit the lift of the valve V, and the upper outer corner of the plate P may be offset more or less, as at 31'', to increase this limit.

In order to more accurately apply the pressure of the spring S according to this invention, the upper side of the plate P has a central boss 32 axially alined with the valve V and provided with a rounded or convex outer surface. This boss extends into a central socket 34 in the lower face of a washer K, and the convex surface of the boss engages a concave surface in the socket which is of somewhat greater radius of curvature than that of the boss, so that the washer K and plate P have substantially spherical surfaces adapted to cooperate to automatically centralize the pressure of the helical spring S on the diaphragm and the valve.

The washer K also has a shoulder 33 in a plane below the bottom of the socket 34 to provide a bearing for the lower end of the spring S, and a reduced section 33' of the washer K fits closely within the lower turns of this spring. The upper end of the spring S bears against a similar shoulder 35 on a washer L which has a reduced section 35' that projects farther into the spring than the lower washer section 33'. Part of the section 35' adjacent the shoulder 35 closely fits within the upper turns of the spring, and the diameter of the flange which forms the shoulder 35 is such that the clearance between the edge of this flange and the adjoining inside cylindrical surface of the cap B is just sufficient for relative sliding adjustment but prevents misalinement of the upper end of the spring.

The upper spring washer L has a central socket 36 in its top face to receive the lower part of the pressure adjusting screw T which terminates in a rounded or substantially hemispherical end 37 adapted to engage the conical bottom 36' of the socket, to centralize the pressure of the screw T against the washer L. The point of engagement of the end 37 of the adjusting screw T with the conical bottom 36' of the socket 36 is preferably a substantial distance below the bearing point of the shoulder 35 of the washer L on the spring S, so that the tendency of the spring to deflect laterally and buckle is minimized. The screw T is threaded to cooperate with a tapped drilling 38 in the top of the cap B, and may be adjusted by turning a hexagonal head 39 fixed to its outer end. A lock nut 40 assists in retaining the screw T in any one of its adjusted positions.

A number of openings 41 in the wall of the cap B admit atmospheric pressure to the inside of the cap and also serve as safety vents for allowing the escape of gas in the event of a rupture in the diaphragm. Suitable nipple and flange members 42 and 43 may be secured to the inlet 10 and outlet 11 to connect the same to a pipe line or the like.

The foregoing manner of compressing and retaining the spring tends to minimize the effect of crooked springs or of springs having ends not ground square to the center line. The full force of the spring S bears against a relatively small area of the convex boss of the plate P and permits smooth operation of the valve. In addition the spring S may have a low spring constant, so that it will change relatively little in compressive force for the distance compressed. This permits substantially the same force to be exerted against the valve element for the total valve lift and consequently opens the valve and maintains it open in response to only one value of pressure acting against diaphragm D for any one setting of the valve.

The valve element V and the nozzle N preferably consist of a non-corrosive metal harder than steel, or a nitrided, surface-hardened ferrous alloy containing chromium and vanadium in proportions of about 1.40% to 1.60% chromium, about 0.45% minimum vanadium, and the remainder of steel with a carbon content of about 0.30%. This preferred material may be ground to optical flats in forming the sealing faces 18 and 20 and will withstand a maximum of wear without becoming scored.

The diaphragm D preferably consists of a non-corrosive flexible metal such as "Everdur" which is an alloy comprising about 82% to 96.5% copper, about 3% to 15% silicon, and about 0.3% to 0.8% manganese. The spring S and the friction ring F preferably consist of high grade spring-steel wire. Other parts of the valve may be made of brass or bronze compositions suitable for high pressure oxygen service.

The operation of the improved valve will be apparent from the drawing and the foregoing description. Assuming that the spring S has been set for a predetermined relief pressure, the cooperating faces 18 and 20 will remain in sealing contact until this pressure is built up in the chamber C and the line to which it is connected, whereupon the valve V will quickly lift to its maximum opening, and it will close as quickly and completely when the pressure in the chamber C falls below the predetermined value. While the valve is in operation and when it is closed, the friction spring F maintains a constant frictional force against the bore 22 of the nozzle N and against the walls of the groove 24 in the stem 21, and thereby substantially prevents chattering and humming of the valve element V and contributes to provide a smoothly-operating, efficient relief valve.

Although a preferred form of this invention has been disclosed in detail, it will be understood that certain features herein shown may be used in other types of valves and devices, and various changes may be made in the structure as disclosed without departing from the principles of the invention or sacrificing their advantages.

I claim:

1. In a valve, the combination of a nozzle having a tubular bore and a seat adjacent one end of said bore; a pressure-responsive diaphragm; a valve element secured to one side of said diaphragm, said element having a seating face cooperating with such nozzle seat and also having a tubular stem slidable axially in said bore, said stem having one or more ports adjacent the end thereof near such cooperating seating face and nozzle seat, said stem also having an exterior circumferential groove therein adjacent the other end of the stem; resilient means seated in said groove and bearing against the surface of said bore to dampen the movements of said valve element relatively to said nozzle; a spring; and a pair of members for transmitting the pressure of said spring to the other side of said diaphragm axially in line with said element and said nozzle, said members having cooperating curved surfaces of unequal curvature and one of said members being secured against said other side of the diaphragm.

2. In a valve the combination of a body; a partition dividing said body into inlet and outlet chambers, said partition having an opening therethrough; a nozzle secured in said opening and having a bore and a seat; a movable valve element having a seating face adapted to cooperate with said seat and also having a tubular depending portion adapted to slide within said bore, said depending portion having a plurality of passages through the wall thereof below the level of said seating face; said nozzle and said valve element cooperating to form an annular space adjacent the inner portion of said seat and extending below said passages when said face and seat are only slightly parted, and said tubular depending portion having a circumferential recess adjacent the lower end thereof; and a resilient expansible metal ring seated in said recess and having sinuous bends lengthwise thereof, alternate bends extending axially beyond the central plane of said ring, said ring engaging the surface of said bore to resist movements of said valve element with respect to said nozzle.

WILGOT J. JACOBSSON.